United States Patent Office 3,290,336
Patented Dec. 6, 1966

3,290,336
EPOXIDE PRODUCTION
James D. McClure, San Francisco, Calif., assignor to Shell Oil Company, New York, N.Y., a corporation of Delaware
No Drawing. Filed May 29, 1963, Ser. No. 284,014
3 Claims. (Cl. 260—348.6)

This invention relates to an improved method for the production of epoxides. More particularly, it relates to the production of epoxides from halohydrins.

Compounds containing an epoxide linkage, i.e., an oxirane ring, have gained considerable importance as chemical intermediates and as monomers from which epoxy resins are prepared. While methods are available for introducing an epoxide linkage by epoxidation of an olefin with hydrogen peroxide or a peracid, the production of epoxides by dehydrohalogenation of a vic-halohydrin remains a preparative method of considerable importance. Dehydrohalogenation of a halohydrin to the corresponding epoxide is customarily effected by treatment of the halohydrin with one of a variety of basic compounds, including alkali metal oxides, hydroxides and carbonates, alkali metal alkoxides and tertiary amines. Although this general method is effective in most cases, substantial or complete failure of this method for epoxide production is encountered when the halohydrin reactant possesses an electron withdrawing group as a substituent on a carbon atom adjacent to the vic-halohydrin moiety. In such cases, base-catalyzed dehydrohalogenation processes produce low yields of epoxide product or no epoxide product at all. The failure of the synthetic method is believed to be the result of base abstraction of a proton from the carbon atom adjacent to the epoxide linkage, the hydrogen atom being activated by the presence of the electron-withdrawing substituent on the same carbon atom. The subsequent rearrangement to ahydroxy olefin results in the lowering of the yield of epoxide product to the point where little or no epoxide product is observed. For example, only minor amounts of methyl 3,4-epoxybutyrate are produced when methyl 4-chloro-3-hydroxybutyrate is treated with methanolic sodium methoxide, the major product being methyl 4-hydroxycrotonate. Thus, epoxides wherein the adjacent carbon atom possesses an electron-withdrawing substituent are considered to be base-sensitive and efficient methods for the production of such epoxides in the presence of base are not available.

It is an object of this invention to provide an improved process for the production of epoxides. A more specific object is to provide a process for the production of base-sensitive epoxides by dehydrohalogenation of halohydrins. An additional object is to provide a process for the dehydrohalogenation of vic-halohydrins to produce the corresponding epoxides wherein a carbon atom adjacent to the epoxide linkage possesses an electron-withdrawing substituent.

It has now been found that these objects are accomplished by the process of reacting a vic-halohydrin possessing an electron-withdrawing substituent on a carbon atom adjacent to the halohydrin moiety, in a neutral reaction diluent, with an oxide of a metal whose corresponding halide is water-insoluble.

The vic-halohydrins suitable as reactants in the novel process of the invention are those halohydrins possessing an electron-withdrawing group as a substituent on a carbon atom adjacent to the halohydrin moiety. The halohydrin is acyclic or is cyclic with the halohydrin and electron-withdrawing group attached to or incorporated within the cyclic structure. By an electron-withdrawing substituent is meant a substituent which, when attached to an aromatic ring, is considered to be meta-directing or ring deactivating. Illustrative of such electron-withdrawing groups are the nitro, cyano, formyl, carboxy, amido, carboalkoxy, acyl, sulfonyl, trihalomethyl and the like groups. Preferred halohydrin reactants have a molecular weight below about 350, and are represented by the formula

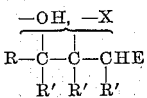

wherein R and R' independently are hydrogen, alkyl or aryl, X is halogen and E represents a cyano

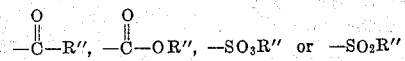

group wherein R" is alkyl or aryl, with the further proviso that when R and R" are each alkyl, they may together form a divalent alkylene radical having from 1 to 2 carbon atoms. The groups R, R' and R" may be hydrocarbyl or may be substituted with additional —OH, —X, or E substituents, which substituents are, of course, not deleterious to the process of the invention. Thus, the halohydrin reactants contain only hydroxyl, halogen and E substituents besides carbon and hydrogen atoms.

As the principal advantages of the process of the invention lie in the stability of the epoxide product under the conditions of the dehydrohalogenation reaction, relative positions of the halogen and hydroxyl groups are not material, so long as one group is located beta and the other group is located gamma to the E substituent. Thus, in the case where R and R' are hydrogen and E is cyano, the isomers 4-halo-3-hydroxybutyronitrile and 3-halo-4-hydroxybutyronitrile are equally suitable as reactants in the process of the invention.

Preferred monovalent R and R' groups other than hydrogen and preferred monovalent R" groups are alkyl having from 1 to 10 carbon atoms and aryl having from 6 to 10 carbon atoms. Illustrative of the preferred alkyl groups are methyl, ethyl, propyl, isopropyl, n-butyl, tert-butyl, hexyl, decyl and benzyl radicals, while preferred aryl groups include phenyl, naphthyl, tolyl, xylyl and p-tert-butylpheny. Best results are obtained when R and R' groups independently are hydrogen, alkyl having 1 to 4 carbon atoms, or phenyl, and further preferred are the halohydrin reactants of the above-depicted formula wherein R' is hydrogen. Most suitable monovalent R" groups are alkyl having from 1 to 4 carbon atoms, although also preferred are the halohydrin reactants wherein the R group of the halohydrin moiety and the R" substitutent of the E group together form a divalent alkylene radical having from 1 to 2 carbon atoms, e.g., methylene, ethylene and ethylidine radicals. When R and R" together form a divalent radical, the resulting halohydrin reactant is cyclic; in these cases, preferred R' groups are hydrogen.

Although fluorohydrins and iodohydrins are operable in the process of the invention, preferred halohydrin reactants comprise the chlorohydrins and bromohydrins, that is, the compounds of the above-depicted formula wherein X is a halogen having an atomic number from 17 to 35, i.e., the middle halogens bromine and chlorine.

When the E substituent of the halohydrin reactant is cyano, the reactants are halohydroxynitriles, e.g., β-halo-γ-hydroxynitriles and γ-halo-β-hydroxynitriles. Illustrative of suitable nitrile reactants of these types are 4-chloro-3-hydroxybutyronitrile, 3-chloro-4-hydroxybutyronitrile, 4-bromo-3-hydroxybutyronitrile, 3-bromo-4-hydroxy-4-phenylvaleronitrile, 4-iodo-3-hydroxybutyronitrile, and 1-cyano-2-bromo-3-hydroxyoctane.

Halohydrin reactants wherein E represents

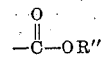

are esters including the inner esters, lactones, when R″ and the R group of the halohydrin moiety together form a divalent radical. Exemplary esters are methyl 4-chloro-3-hydroxybutyrate, propyl 3-bromo-4-hydroxyhexanoate, phenyl 4-chloro-3-hydroxyheptanoate, butyl 4-bromo-3-hydroxyvalerate, 4-chloro-3-hydroxyvalerolactone and 3-fluoro-4-hydroxyvalerolactone.

Also suitable as halohydrin reactants are halohydroxy-ketones, i.e., the compounds of the above-depicted formula wherein E represents

Exemplary reactants of this type are 5-chloro-4-hydroxy-2-pentanone, 6-bromo-7-hydroxy-4-octanone, and 3-chloro-2-hydroxypropyl phenyl ketone; as well as cyclic ketones as when R″ and the R group of the halohydrin moiety together are a divalent radical. Illustrative of cyclic ketone reactants are 3-chloro-4-hydroxycyclohexanone, 4-bromo-3-hydroxy-4,5-diethylcyclohexanone, 4-chloro-3-hydroxycyclopentanone and 3-bromo-4-hydroxycyclopentanone.

When the E substituent represents —$SO_2R″$, the halohydrin reactants are sulfones. Thus, acyclic sulfones such as 3-chloro-2-hydroxypropyl ethyl sulfone, 3-bromo-2-hydroxyamyl butyl sulfone and 2-chloro-3-hydroxy-4-ethylhexyl methyl sulfone are suitable halohydrin reactants, as are cyclic sulfones such as 4-chloro-3-sulfolanol, 4-bromo-3-sulfolanol, and 3-bromo-4-hydroxypentamethylene sulfone.

The term E may further represent —$SO_3R″$, in which case the halohydrin reactants are halohydroxy sulfonic acid esters, e.g., methyl 3-chloro-2-hydroxypropane sulfonate, octyl 2-bromo-3-hydroxypentanesulfonate, and phenyl 3-chloro-2-hydroxybutanesulfonate. Also suitable are cyclic sulfonic acid esters, i.e., sultones, such as 4-chloro-3-hydroxybutanesultone and 4-bromo-3-hydroxypentanesultone.

The halohydrin reactant is dehydrohalogenated by treatment with metal oxide in inert reaction diluent. Preferred as the metal oxide in the dehydrohalogenation process is silver oxide. Best results are obtained when the silver oxide is employed in finely divided form, although the particle size is not critical. The silver oxide is substantially insoluble in the reaction mixture, and is employed as a suspension. It is preferred that the silver oxide employed be substantially anhydrous, that is, contain no adsorbed moisture.

The silver oxide is customarily employed in molar amounts equivalent to or in excess over the halohydrin reactant, although an excess of halohydrin may be employed. Molar ratios of silver oxide to halohydrin from about 1:2 to about 5:1 are satisfactory, while molar ratios from about 1:1 to about 3:1 are preferred.

The reaction diluent employed in the process of the invention is one which is capable of dissolving the organic reactant and products, is inert toward the epoxide linkage produced, is liquid at reaction temperature and pressure, and is a neutral diluent, that is, a diluent that is neither acidic nor basic. The success of the reaction process is to a great degree dependent upon the nature of the reaction diluent. Acidic diluents are reactive toward addition to the epoxide function produced, while reaction diluents that are basic promote rearrangement of the epoxide to the isomeric hydroxy-olefin. Suitable reaction diluents include the ketones, particularly hydrocarbonones, e.g., methyl ethyl ketone, acetone, butyl hexyl ketone, cyclohexanone and acetophenone; hydrocarbons such as benzene, toluene, xylene, hexane, octane, isooctane and cyclohexane; esters, particularly lower alkyl esters such as ethyl acetate, butyl propionate and methyl butyrate; sulfones such as methyl ethyl sulfone, propyl butyl sulfone, sulfolane; and methyl sulfolane; and nitriles such as acetonitrile, propionitrile and butyronitrile. The preferred solvents for the process of the invention comprise internal oxahydrocarbons, e.g., the ethers, particularly hydrocarbon ethers such as dialkyl ethers, e.g., diethyl ether, dibutyl ether, ethyl hexyl ether and propyl octyl ether; diaryl ethers including diphenyl ether and phenyl β-naphthyl ether; aryl alkyl ethers including anisole, benzyl β-naphthyl ether and isopropyl phenyl ether; and cyclic ethers such as dioxolane, the dioxanes, tetrahydrofuran, tetrahydropyran, methyltetrahydrofuran and the like. Most preferred, however, are lower alkyl ethers (full) of polyhydric alcohols such as the lower alkyl ethers of ethylene glycol, diethylene glycol, tetraethylene glycol, glycerol and 1,2,6-hexanetriol wherein the alkyl groups have from 1 to 4 carbon atoms, as illustrated by dimethoxyethane, 1,2,6-triethoxyhexane, and the dibutyl ether of diethylene glycol.

The reaction diluent employed in the process of the invention is preferably substantially anhydrous, as the presence of moisture results in ring opening of the epoxide product. Although small amounts of moisture, e.g., up to about 2 to 3% of the total reaction diluent, can be tolerated without losing the advantages of the process of the invention, best results are obtained when the reaction diluent is anhydrous. The reaction diluent is employed in molar excess over the silver oxide and halohydrin reactants. Molar ratios of diluent to the limiting reactant from about 3:1 to about 50:1 are satisfactory.

The process of the invention is customarily conducted by mixing the halohydrin, silver oxide and reaction diluent and maintaining the mixture at reaction temperature under an inert atmosphere, e.g., under an inert gas such as nitrogen, argon, helium and the like, until reaction is complete. Best results are obtained when the reaction mixture is agitated, as by shaking or stirring, during the course of reaction. The reaction process may be conducted at atmospheric, subatmospheric or superatmospheric pressure. Although satisfactory results are generally obtained when the reaction is conducted at atmospheric pressure, when low boiling reaction diluents are employed superatmospheric pressure may be required to maintain the reaction diluent in the liquid phase. The optimum reaction temperature is dependent upon the particular halohydrin and reaction diluent employed. Reaction temperatures that are too low result in a decreased rate of reaction, while an upper temperature limit is determined by the decomposition temperature of the reaction products. In general, temperatures from about 25° C. to about 150° C. are satisfactory, with temperatures from about 60° C. to about 120° C. being preferred.

Following reaction, solid materials are customarily removed by filtration. The desired epoxide product is recovered from the filtrate by conventional means, as by fractional distillation or fractional crystallization subsequent to removal of solvent, which may then be recycled. The filtered solids, which chiefly comprise salts of silver are washed to remove adhering organic material and the silver salts are converted back to the oxide, as by boiling with concentrated alkali, and may be recycled.

The advantages of the process of the present invention are manifested in the lessened tendency of the epoxide product, wherein the epoxide linkage is activated by the electron-withdrawing substituent on the adjacent carbon atom, to undergo rearrangement to the isomeric hydroxy-olefin. By effectively restricting rearrangement of the epoxide group, greater yields of epoxide product are obtained than when conventional techniques of dehydrohalogenation in the presence of base are employed, and in some cases, compounds hitherto unobtainable by such methods are produced in good yield.

The epoxide products of the present invention are represented by the formula

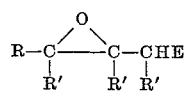

wherein R, R' and E have the previously stated significance. Illustrative of such products are nitriles, e.g., 3,4-epoxybutyronitrile, 1-cyano-2,3-epoxyhexane and 1-cyano-2,3-epoxy-3-methyl-4-phenylbutane; esters including methyl 3,4-epoxybutyrate, propyl 3,4-epoxyvalerate and phenyl 3,4-epoxybutyrate; lactones such as 3,4-epoxyvalerolactone and 3,4-epoxy-4-ethylvalerolactone; ketones such as 4,5-epoxy-2-hexanone, 1,2-epoxy-4-octanone, 3,4-epoxycyclohexanone and 3,4-epoxy-3-methylcyclopentanone; sulfones including sulfolene oxide, 3,4-epoxypentamethylene sulfone, 3,4-epoxy-4-phenylbutyl butyl sulfone and 3,4-epoxyamyl methyl sulfone; sulfonic acid esters such as ethyl 3,4-epoxypropanesulfonate and methyl 2,3-epoxyhexanesulfonate; and sultones such as 2,3-epoxybutanesultone.

The epoxide products of the process of the invention are useful as chemical intermediates. In addition to conventional derivatives of the non-epoxy functional group present, the products are monomers from which useful epoxy resins may be produced by treatment with conventional curing agents.

To further illustrate the process of the invention, the following examples are provided. It should be understood that they are not to be regarded as limitations, as the teachings thereof may be varied as will be understood by one skilled in this art.

*Example I*

A solution of 84 g. of methyl 4-chloro-3-hydroxybutyrate in 650 ml. of anhydrous dimethoxyethane was stirred under nitrogen with 231 g. of finely divided silver oxide at 85° C. for sixteen hours. Solids were removed by filtration and washed several times with fresh solvent. The filtrate was dried and the solvent removed by distillation under reduced pressure. Distillation of the residual liquid gave 52 g. of product, B.P. 55–70° C. at 7 mm., which analysis disclosed to contain 46 g. of methyl 3,4-epoxybutyrate, which represented a 75% yield. No methyl 4-hydroxycrotonate was observed.

Fractional distillation afforded 44 g. of methyl 3,4-epoxybutyrate, B.P. 63–65° C. at 10 mm.

|  | Anal. Calc. | Found |
| --- | --- | --- |
| C, percent w | 51.8 | 51.7 |
| H, percent w | 7.0 | 7.0 |
| Epoxide value, eq./100 g | 0.86 | 0.84 |
| Molecular weight | 116 | 116 |

*Example II*

To illustrate the advantages of the present invention, a conventional dehydrohalogenation was attempted. Over a 10-hour period, 7.1 g. of powdered sodium hydroxide was added to a refluxing solution of methyl 4-chloro-3-hydroxybutyrate in 200 ml. of methylene chloride. The water formed was removed by azeotropic distillation with the solvent, and the distillation was continued for 2 hours after addition was complete. The solids were filtered and washed and the solvent evaporated to give 18 g. of product. Analysis indicated the product contained 2.3 g. of methyl 3,4-epoxybutyrate which represented a yield of 15%. A 33% yield of methyl 4-hydroxycrotonate was observed.

A similar reaction of methyl 4-chloro-3-hydroxybutyrate and sodium methoxide in methanol gave a 3.3% yield of methyl 3,4-epoxybutyrate. The yield of methyl 4-hydroxycrotonate, in contrast, was 64%.

*Example III*

By a procedure similar to that of Example I, 4-chloro-3-hydroxybutyronitrile was reacted with silver oxide in anhydrous dimethoxyethane to afford, upon work-up, a product mixture that contained a 20% yield of 3,4-epoxybutyronitrile, B.P. 51–53° C. at 5 mm.

|  | Anal. Calc. | Found |
| --- | --- | --- |
| C, percent w | 57.8 | 57.6 |
| H, percent w | 6.1 | 6.0 |
| Epoxide value, eq./100 g | 1.20 | 1.18 |
| Molecular weight | 83 | 83 |

*Example IV*

A solution of 34.5 g. (0.2 mole) of 4-chloro-3-sulfolanol in 600 ml. of dry dimethoxyethane was stirred with 92.5 g. of silver oxide under nitrogen for 16 hours at 85° C. The solids were removed from the product mixture by filtration and washed with hot acetone. The washings were combined with the filtrate and the mixture was dried. Following removal of solvent by distillation, initially at atmospheric pressure and later at reduced pressure, the residual solid weighed 24 g., which represented an 89% yield of crude product. Recrystallization of the crude product from acetone afforded 22 g. of sulfolene oxide, M.P. 158–159° C., which represented an 82% yield. The infrared spectrum of the product was consistent with an epoxide, and no depression of melting point was observed when the product was admixed with an authentic sample of sulfolene oxide prepared by another method.

Epoxide value, eq./100 g.: Found (HBr in $HC_2H_3O_2$, 5 hours reaction time): 0.74; Theory: 0.75.

*Example V*

By a procedure similar to that of Example I, when ethyl 2-bromo-3-hydroxypropanesulfonate is heated with silver oxide in dioxane solution, a good yield of ethyl 2,3-epoxypropanesulfonate is obtained.

*Example VI*

When 4-chloro-5-hydroxy-2-hexanone is heated with silver oxide in dihexyl ether, a good yield of 4,5-epoxy-2-hexanone is obtained.

*Example VII*

When methyl 2-chloro-3-hydroxyamyl sulfone is heated with silver oxide in benzene, a good yield of methyl 2,3-epoxyamyl sulfone is obtained.

I claim as my invention:
1. The process for the production of alkyl 3,4-epoxybutyrate by dehydrohalogenating alkyl 4-halo-3-hydroxybutyrate wherein the alkyl is alkyl of from 1 to 10 carbon atoms, by reaction with silver oxide in an inert, neutral, hydrocarbon ether reaction diluent.
2. The process of claim 1 wherein said alkyl 4-halo-3-hydroxybutyrate is alkyl 4-chloro-3-hydroxybutyrate.
3. The process of claim 2 wherein the alkyl 4-chloro-3-hydroxybutyrate is methyl 4-chloro-3-hydroxybutyrate.

References Cited by the Examiner

UNITED STATES PATENTS

| 2,366,724 | 1/1945 | Gardner. |
| 2,581,464 | 1/1952 | Zech _____ 260—348.6 |
| 2,628,255 | 2/1953 | Sexton et al. |
| 2,860,146 | 11/1958 | Furman et al. _____ 260—348.6 |
| 3,014,895 | 12/1961 | Reynolds et al. _____ 260—348.6 |

FOREIGN PATENTS

| 554,639 | 7/1957 | Belgium. |
| 1,107,658 | 5/1961 | Germany. |

OTHER REFERENCES

Clarke et al.: Organic Syntheses, vol. 3, (1922) pp. 47–49.

Raecke, German patent application H–11826 IVb/12q (Kl. 12q 14₀₄), July 5, 1956, 260–348.6 2 pp. spec.

Union Carbide Chemicals Company, "Peracetic Acid and Derivatives" (1957) page 25.

WALTER A. MODANCE, *Primary Examiner.*

NICHOLAS S. RIZZO, N. S. MILESTONE,
*Assistant Examiners.*